(12) United States Patent
Ikenishi et al.

(10) Patent No.: US 7,462,411 B2
(45) Date of Patent: *Dec. 9, 2008

(54) SUBSTRATE FOR INFORMATION RECORDING MEDIUM, INFORMATION RECORDING MEDIUM AND PROCESS FOR PRODUCING THE SAME

(75) Inventors: Mikio Ikenishi, Akishima (JP); Xuelu Zou, Akashima (JP)

(73) Assignee: Hoya Corporation, Tokyo (JP)

( * ) Notice: Subject to any disclaimer, the term of this patent is extended or adjusted under 35 U.S.C. 154(b) by 438 days.

This patent is subject to a terminal disclaimer.

(21) Appl. No.: 10/511,746

(22) PCT Filed: Jun. 2, 2003

(86) PCT No.: PCT/JP03/06956

§ 371 (c)(1),
(2), (4) Date: Feb. 8, 2005

(87) PCT Pub. No.: WO03/102928

PCT Pub. Date: Dec. 11, 2003

(65) Prior Publication Data
US 2005/0117438 A1 Jun. 2, 2005

(30) Foreign Application Priority Data
Jun. 3, 2002 (JP) .............................. 2002-161138
Nov. 7, 2002 (JP) .............................. 2002-324278

(51) Int. Cl.
- B32B 17/10 (2006.01)
- G11B 5/706 (2006.01)
- C03C 3/091 (2006.01)

(52) U.S. Cl. ........................ 428/846.9; 428/409; 501/66

(58) Field of Classification Search ................ 65/29.21, 65/30.14, 64, 66; 501/5, 14, 15, 55, 59, 65, 501/70, 108; 428/846.3, 846.9, 848, 409 428/410

See application file for complete search history.

(56) References Cited

U.S. PATENT DOCUMENTS

| 5,391,622 | A | 2/1995 | Ho et al. |
|---|---|---|---|
| 5,846,280 | A | 12/1998 | Speit |
| 6,332,338 | B1* | 12/2001 | Hashimoto et al. ......... 65/29.21 |
| 6,413,892 | B1 | 7/2002 | Koyama et al. |
| 6,627,566 | B1* | 9/2003 | Zou .............................. 501/5 |
| 6,818,576 | B2* | 11/2004 | Ikenishi et al. ........... 428/846.9 |
| 2001/0038930 | A1* | 11/2001 | Yamamoto et al. .......... 428/828 |
| 2002/0010066 | A1* | 1/2002 | Nakashima et al. ........... 501/69 |
| 2002/0022564 | A1* | 2/2002 | Minamikawa et al. ......... 501/4 |
| 2002/0031670 | A1* | 3/2002 | Goto et al. ..................... 501/4 |

FOREIGN PATENT DOCUMENTS

| JP | 1-239036 A | 9/1989 |
|---|---|---|
| JP | 10-067537 | 3/1998 |
| JP | 10-083531 | 3/1998 |
| JP | 10-255246 | 9/1998 |
| JP | 11-11974 | 1/1999 |
| JP | 11-060265 | 3/1999 |
| JP | 11-180738 | 7/1999 |
| JP | 11-278864 | 10/1999 |
| JP | 2000-001330 | 1/2000 |
| JP | 2000-082211 | 3/2000 |
| JP | 2000-293844 | 10/2000 |
| JP | 2000-293846 | 10/2000 |
| JP | 2001-19466 | 1/2001 |
| JP | 2001-58843 | 3/2001 |
| JP | 2001-126234 | 5/2001 |
| JP | 2002-008222 | 1/2002 |
| WO | WO 99/06333 | 2/1999 |

* cited by examiner

*Primary Examiner*—Carol Chaney
*Assistant Examiner*—Louis Falasco
(74) *Attorney, Agent, or Firm*—Nixon & Vanderhye P.C.

(57) ABSTRACT

A substrate for an information recording medium, which substrate is made of a highly heat-resistant and low-alkali-elution glass and is suitable as a substrate for forming a perpendicular-magnetic-recording-mode layers thereon at a high temperature with a sputtering machine, the substrate being made of an alkali-metal-oxide-containing glass having a glass transition temperature (Tg) of 620° C. or higher and satisfying a requirement that the alkali ion elution amount per a unit area when the glass is immersed in water having a temperature of 80° C. for 24 hours is 0.2 μmol/cm² or less, an information recording medium having an information recording layer formed on the substrate, and a process for producing the information recording medium.

8 Claims, No Drawings

SUBSTRATE FOR INFORMATION RECORDING MEDIUM, INFORMATION RECORDING MEDIUM AND PROCESS FOR PRODUCING THE SAME

This application is the US national phase of international application PCT/JP03/06956 filed 2 Jun. 2003 which designated the U.S. and claims benefit of JP 2002-161138, dated 3 Jun. 2002 and JP 2002-324278, dated 7 Nov. 2002, the entire contents of each of which are hereby incorporated by reference.

BACKGROUND OF THE INVENTION

1. Field of the Invention

The present invention relates to a substrate for an information recording medium which substrate contains an alkali metal oxide but causes remarkably less elution of alkali metal ion, an information recording medium having the above substrate and a process for producing the information recording medium. Particularly, it relates to a substrate for a magnetic recording medium which substrate is suitable for forming a perpendicular-magnetic-recording-mode magnetic layer with a high-temperature sputtering machine, and a magnetic recording medium and a process for producing the magnetic recording medium.

2. Prior Art

Conventionally, aluminum, glass, ceramics, or the like, is used as a substrate material for a magnetic recording medium. At present, aluminum and glass are practically used depending upon a size and use. Of these, the use of a glass substrate is expanding year after year since the glass substrate has fewer surface defects and is excellent in smoothness and surface hardness. As a glass for use as a substrate for a magnetic recording medium, there are known a chemically strengthened glass based on ion exchange and a crystallized glass. Concerning a chemically strengthened glass, there is known a glass substrate for a magnetic disk, which glass substrate is formed by chemically strengthening a glass containing, by % by weight, 50 to 85% of $SiO_2$, 0.5 to 14% of $Al_2O_3$, 10 to 32% of $R_2O$ (R is alkali metal ion), 1 to 15% of ZnO and 1.1 to 14% of $B_2O_3$ by an ion exchange method using alkali ion and has a compression stress layer formed in a glass substrate surface (for example, see JP-A-1-239036). Concerning a crystallized glass, there is known a crystallized glass substrate for a magnetic disk, which substrate contains, by % by weight, 65 to 83% of $SiO_2$, 8 to 13% of $Li_2O$, 0 to 7% of $K_2O$, 0.5 to 5% of MgO, 0 to 5% of ZnO, 0 to 5% of PbO, the total content of MgO+ZnO+PbO being 0.5 to 5%, 1 to 4% of $P_2O_5$, 0 to 7% of $Al_2O_3$ and 0 to 2% of $As_2O_3+Sb_2O_3$ and contains fine $Li_2O$—$2SiO_2$ crystal grains as a main crystal (for example, see Patent U.S. Pat. No. 5,391,622).

With the progress of higher-density recording in recent years, however, it is demanded that a longitudinal recording method should be converted to a perpendicular magnetic recording method for an information recording device such as a magnetic disk typified by a hard disk. In the longitudinal magnetic recording method, a domain easily rotates under heat of a room temperature degree, and it is therefore pointed out that when the recording density increases, writing is no longer possible, so that written data is easily lost. The above phenomenon is known as a thermal fluctuation problem and is coming to be an obstacle to a longitudinal magnetic recording method. For coping with the thermal fluctuation problem in the longitudinal magnetic recording method, the perpendicular magnetic recording method has been actively studied in recent years for its practical use.

With regard to the layer constitution of the above perpendicular magnetic recording method, there are known a single-layer film having a perpendicular magnetic recording layer formed on a non-magnetic substrate, a double-layer film having a soft magnetic layer and a magnetic recording layer stacked consecutively and a three-layer film having a hard magnetic layer, a soft magnetic layer and a magnetic recording layer stacked consecutively. Of these, double-layer films and three-layer films are vigorously developed in recent years for practical use, since they are more suitable for higher-density recording and maintenance of magnetic moment stability than the single-layer film. And, for improving the properties of the above multi-layered-film-applied magnetic perpendicular magnetic recording media, it is said that it is required to form the films with a high-temperature sputtering machine and to heat-treat the formed films at high temperatures.

However, an aluminum substrate that has been generally used so far has a low heat resistance of 280° C. Further, when a conventional chemically strengthened glass is used at a temperature in a chemical strengthening temperature range (350-420° C.) or a temperature higher than such a range, a surface stress caused by ion exchange for the chemical strengthening is relaxed, and the substrate strength sharply decreases, so that it is required to use a generally chemically strengthened glass at a temperature of 350° C. or lower. In the perpendicular magnetic recording method, it is required to form a film with a sputtering machine at a high temperature of 400° C. or higher or anneal the film of stacked layers at a temperature of 400° C. or higher, for improving a magnetic film in magnetic characteristic. It is therefore clear that none of aluminum substrates and chemically strengthened glass substrates commercially available at present can cope with the above requirement, and a glass substrate having high heat resistance is demanded.

For obtaining excellent heat resistance, a glass material that does not contain any alkali metal oxide so far essential for a chemically strengthened glass may be taken into account. However, in this case, there is caused a problem that the meltability of such a glass decreases since the glass viscosity during melting increases. When a magnetic disk is incorporated into a drive unit, it is required to impart a glass substrate with a larger thermal expansion coefficient for conforming the thermal expansion coefficient of the glass substrate to the counterpart of a metal fixing member to fix a disk. However, it is difficult to impart a glass containing no alkali metal oxide with the thermal expansion coefficient that a substrate for an information recording medium is required to have.

Further, when an alkali metal oxide is introduced for attaining excellent glass meltability and an excellent thermal expansion coefficient, there is a problem that an alkali is eluted from a glass substrate and has a detrimental effect on an information recording layer.

Conditions that a glass material for a substrate for an information recording medium is required to satisfy are summarized as follows.

① High heat resistance
② Excellent meltability
③ Low alkali-elution property

SUMMARY OF THE INVENTION

Under the circumstances, it is an object of the present invention to provide a substrate for an information recording medium, which substrate is made of a glass having high heat resistance and a low alkali-elution property satisfying the above properties required, an information recording medium comprising such a substrate and a process for producing the information recording medium. Particularly, it is an object of the present invention to provide a substrate for a magnetic recording medium, which substrate is suitable for forming a perpendicular-magnetic-recording-mode magnetic film with a high-temperature sputtering machine, a magnetic recording medium and a process for producing the magnetic recording medium.

The present inventors have made diligent studies and as a result have found that the above object can be achieved by a substrate for an information recording medium, which substrate is made of a glass containing an alkali metal oxide, having a glass transition temperature (Tg) of a certain temperature or higher and satisfying a requirement that a metal ion elution amount when the substrate is immersed in water under predetermined conditions is equivalent to, or lower than, a predetermined value. The present invention has been accordingly completed on the basis of the above finding.

That is, the present invention provides;

(1) a substrate for an information recording medium, which substrate is made of an alkali-metal-oxide-containing glass, the glass having a glass transition temperature (Tg) of 620° C. or higher and satisfying a requirement that the alkali ion elution amount per a unit area when the glass is immersed in water having a temperature of 80° C. for 24 hours is 0.2 μmol/cm² or less, (2) a substrate for an information recording medium as recited in the above (1), wherein the alkali-metal-oxide-containing glass contains $SiO_2$, $Al_2O_3$, CaO, BaO and $K_2O$ as essential components, (3) a substrate for an information recording medium as recited in the above (1), wherein the alkali-metal-oxide-containing glass is formed from $SiO_2$, $Al_2O_3$, CaO, BaO, $K_2O$, MgO, SrO, $TiO_2$, $ZrO_2$, $Li_2O$, $Na_2O$ and ZnO, (4) a substrate for an information recording medium as recited in the above (3), which has no chemically strengthened layer and wherein the alkali-metal-oxide-containing glass substantially contains, by mol %, more than 50% but not more than 70% of $SiO_2$, 1 to 12% of $Al_2O_3$, 2 to 25% of CaO, more than 0% but not more than 15% of BaO, 3 to 15% of $K_2O$, 0 to 10% of MgO, 0 to 15% of SrO, 0 to 10% of $TiO_2$, 0 to 12% of $ZrO_2$, 0 to less than 1% of $Li_2O$, 0 to 8% of $Na_2O$ and 0 to 1% of ZnO, (5) a substrate for an information recording medium as recited in the above (3), which has a chemically strengthened layer in a surface thereof and wherein the alkali-metal-oxide-containing glass substantially contains, by mol %, more than 50% but not more than 70% of $SiO_2$, 1 to 10% of $Al_2O_3$, 2 to 25% of CaO, 1 to 15% of BaO, 3 to 15% of $K_2O$, 0 to 3% of MgO, 0 to 15% of SrO, 0 to 10% of $TiO_2$, more than 0% but not more than 12% of $ZrO_2$, 0 to less than 1% of $Li_2O$, 1 to 8% of $Na_2O$ and 0 to 1% of ZnO, the total content of $SiO_2$, $Al_2O_3$ and $ZrO_2$ being more than 70% by weight, (6) a substrate for an information recording medium as recited in the above (3), which has a chemically strengthened layer in a surface thereof and wherein the alkali-metal-oxide-containing glass substantially contains, by mol %, more than 50% but not more than 70% of $SiO_2$, 1 to 10% of $Al_2O_3$, 15 to 25% of CaO, 1 to 15% of BaO, 3 to 15% of $K_2O$, 0 to 3% of MgO, 0 to 15% of SrO, 0 to 10% of $TiO_2$, more than 0% but not more than 12% of $ZrO_2$, 0 to less than 1% of $Li_2O$, 1 to 8% of $Na_2O$ and 0 to 1% of ZnO, (7) a substrate for an information recording medium as recited in any one of the above (1) to (6), which has an average linear thermal expansion coefficient (α), measured at a temperature of 100 to 300° C., of $70 \times 10^{-7}/°$ C. or more, (8) a substrate for an information recording medium as recited in any one of the above (1) to (7), wherein the alkali-metal-oxide-containing glass has a specific gravity of 3.5 or less, (9) a substrate for an information recording medium as recited in any one of the above (1) to (8), which is a substrate for a perpendicular-magnetic-recording-mode information recording medium,

(10) an information recording medium comprising an information recording layer formed on the substrate for an information recording medium as recited in any one of the above (1) to (9),

(11) an information recording medium as recited in the above (11), which is a perpendicular magnetic recording medium, and

(12) a process for producing an information recording medium, comprising the step of forming an information recording layer on a substrate for an information recording medium, the process employing the substrate for an information recording medium as recited in any one of the above (1) to (9) and comprising heating said substrate to 400 to 600° C. in said step.

PREFERRED EMBODIMENTS OF THE INVENTION

The substrate for an information recording medium, provided by the present invention, is made of an amorphous glass which is suitable for forming a film thereon at a high temperature in the range of 400 to 600° C. and free from deformation under heat treatment at a high temperature in the range of 400 to 600° C. while retaining excellent properties of a conventional glass substrate such as high smoothness and high flatness, and which causes remarkably less elution of alkali metal ion (to be sometimes referred to as "alkali elution amount" hereinafter) while containing an alkali metal oxide so that the glass meltability is not impaired. For preventing the deformation of the substrate under the above heat treatment at a high temperature, the substrate is constituted of a glass having a glass transition temperature (Tg) of at least 620° C., preferably at least 650° C., more preferably at least 680° C., still more preferably at least 700° C. Although not specially limited, the upper-limit of the above glass transition temperature is generally about 900° C.

For a substrate for an information recording medium, which substrate has a chemically strengthened layer to be described later, a glass is immersed in a molten salt containing an alkali metal compound for carrying out ion exchange. When a glass having a very high glass transition temperature (Tg) is chemically strengthened, the temperature of the molten salt is required to be very high. In this case, the molten salt is decomposed, and a decomposition product will corrode the glass surface. For preventing such corrosion, desirably, the glass transition temperature (Tg) of a substrate to be chemically strengthened is adjusted to 800° C. or lower.

While the glass substrate of the present invention contains an alkali metal oxide for imparting the glass with excellent meltability, the alkali elution amount thereof is remarkably small. The above alkali elution amount is expressed as an elution amount per a unit area when a substrate is immersed in water having a temperature of 80° C. for 24 hours, and the value of the alkali elution amount of the glass substrate of the present invention is 0.2 μmol/cm² or less ($0.2 \times 10^{-6}$ mol/cm² or less). The above properties combined can give a substrate for an information recording medium, which substrate is suitable for higher-density recording. When the above alkali elution amount is larger than 0.2 μmol/cm², an alkali metal in the glass is eluted in the step of washing the substrate to roughen the substrate surface, so that the smoothness of the substrate surface finished by polishing and lapping is impaired. There is also caused another problem that an information recording layer is corroded by an alkali metal that precipitates from the substrate after the information recording layer is formed. The alkali elution amount is preferably 0.1 µmol/cm$^2$ or less, more preferably 0.05 µmol/cm$^2$ or less.

The above alkali elution amount refers to a value determined by the following measurement method.

[Method of Measuring Alkali Metal Ion Elution Amount (Alkali Elution Amount)]

A glass sample having clean surfaces is placed in a hermetically closable container and weighed, and its mass is taken as mass A. Then, approximately 20 ml of ultrapure water having a temperature of 70 to 75° C. is added to the container such that the glass sample is completely immersed in the water, and the container with the glass sample in it is allowed to stand in a hermetically closed state for 24 hours in a state where the temperature inside the container is kept at 80° C. Then, the container in a hermetically closed state is weighed, and its mass is taken as mass B. Then, the glass sample is taken out. The mass of the water in which the glass sample has been immersed is obtained by deducting mass A from mass B. Then, an alkali metal element that has been eluted into the water in which the glass sample has been immersed is measured for a concentration with ICP-AES (ICP emission spectroscopy analyzer "VISTA AX" supplied by Barian). An amount of the eluted alkali metal element is calculated on the basis of the concentration of the alkali metal element and the mass of the water, and the amount is divided by a surface area of the glass sample to determine an alkali elution amount. For the above measurement, it is required to fully take care of the purity of water in which a glass sample is to be immersed, the cleanness of a container, the elution from the container to the water and other factors that may degrade the measurement accuracy. When the glass contains a plurality of alkali metal elements, the amount (by mol) of each alkali metal ion contained in water in which a glass sample is immersed is measured and calculated with regard to the concentration of each alkali metal ion, and the total amount is divided by the surface area of the glass sample, to obtain an alkali metal ion elution amount.

Since the chemical strengthening step can be omitted, the glass substrate of the present invention preferably has no chemically strengthened layer. According to the glass substrate of the present invention, it is possible to control the alkali elution amount to a low level without carrying out chemical strengthening, and the chemical strengthening step can be omitted.

From the viewpoint of preventing the breakage of a substrate by imparting the substrate with high mechanical strength, the glass substrate of the present invention preferably has a chemically strengthened layer.

The glass composition common to the glass substrate having no chemically strengthened layer and the glass substrate having a chemically strengthened layer in a surface contains $SiO_2$, $Al_2O_3$, CaO, BaO and $K_2O$ as essential components. Further, preferably, the above glass composition contains $SiO_2$, $Al_2O_3$, CaO, BaO, $K_2O$, MgO, SrO, $TiO_2$, $ZrO_2$, $Li_2O$ and ZnO. The glass for constituting the glass substrate having no chemically strengthened layer preferably contains $SiO_2$, $Al_2O_3$, CaO, BaO and $K_2O$ as essential components (to be referred to as "glass I" hereinafter). The above glass composition can give a substrate for an information recording medium, which has high heat resistance, a high expansion property, a low alkali-elution property and high glass stability in combination.

Further, the glass I having the above glass composition is preferably an alkali-metal-oxide-containing glass having a composition substantially containing, by mol % (contents of glass components refer to contents by mol % unless otherwise specified, and parenthesized values refer to preferred contents by % by weight), more than 50 but not more than 70% (less than 58% by weight) of $SiO_2$, 1 to 12% (20% by weight or less) of $Al_2O_3$, 2 to 25% (more than 6% by weight but less than 21% by weight) of CaO, more than 0 but not more than 15% (more than 5% by weight) of BaO, 3 to 15% (more than 3% by weight) of $K_2O$, 0 to 10% (less than 12% by weight) of MgO, 0 to 15% of SrO, 0 to 10% of $TiO_2$, 0 to 12% of $ZrO_2$, 0 to less than 1% (less than 1% by weight) of $Li_2O$, 0 to 8% of $Na_2O$ and 0 to 1% (less than 1% by weight) of ZnO.

The function and amount range of each component in the glass I will be explained in detail below.

$SiO_2$ is a main component for forming a glass network structure, and when the content thereof is 50% or less, the durability of the glass is degraded, and the glass is liable to devitrify. When the content thereof exceeds 70% (or is 58% by weight or more), the glass has a small Young's modulus, and it has a high viscosity at high temperatures, so that the glass is difficult to melt. The content of $SiO_2$ is therefore in the range of more than 50% but not more than 70%, and preferably less than 58% by weight. It is particularly preferably in the range of more than 50% but not more than 67%.

$Al_2O_3$ is essential not only as a component for greatly improving the glass in durability and heat resistance but also as a component for stabilizing the glass structure and improving the rigidity of the glass structure. When the content thereof is less than 1%, the effect on preventing the elution of an alkali from the glass tends to decrease, and it is difficult to produce a glass having excellent durability. When the content thereof exceeds 12% (or exceeds 20% by weight), the meltability of the glass at high temperatures tends to be degraded, so that it is preferred to the content thereof to 1 to 12% (20% by weight or less). The content of $Al_2O_3$ is more preferably in the range of 2 to 12%.

The total content of the above $SiO_2$ and $Al_2O_3$ is preferably in the range of 57 to 79%. When this total content is less than 57%, the durability of the glass may be insufficient.

MgO, CaO, ZnO, SrO and BaO have a great effect on decreasing the viscosity of the glass during melting to promote the melting, and also have a great effect on increasing the Young's modulus and the thermal expansion coefficient of the glass. However, when the content thereof exceeds 30%, the durability of the glass tends to be degraded, and the devitrification temperature tends to increase.

CaO is an essential component that has a great effect on improving the glass in Young's modulus and thermal expansion and decreasing the melting viscosity. When the content of CaO is less than 2%, the above effects are small. When the content thereof is more than 25%, the stability of the glass tends to be degraded. The content of CaO is therefore preferably in the range of 2 to 25%, more preferably in the range of 3 to 20%.

BaO works to improve the thermal expansion and has an effect on improving the durability of the glass. However, when an excess amount of BaO is introduced, the durability tends to be rather degraded. When BaO is introduced, the specific gravity increases to a great extent, so that the content of BaO is preferably in the range of more than 0% but not more than 15% (more than 5% by weight), more preferably 14% or less.

When the other MgO, ZnO and SrO are added in a total amount that does not exceeds a preferred range, it can be expected that they can stabilize the stability of the glass structure and increase Young's modulus and thermal expansion of the glass. MgO, ZnO and SrO produce a greater effect when various divalent components are introduced in a small amount each than when one of them is introduced in a large amount. Therefore, preferably, the content of MgO is in the range of 0 to 10% (less than 12% by weight), the content of SrO is in the range of 0 to 15% (4.5% by weight or less), and the content of ZnO is in the range of 0 to 1% (less than 1% by weight). More preferably, the content of SrO is 0 to 10%, and the content of ZnO is 0%.

For the reason described above, the total content of MgO, CaO, SrO, BaO and ZnO is preferably 30% or less, more preferably 3 to 30%, still more preferably in the range of 3 to 25%.

$Li_2O$, $Na_2O$ and $K_2O$ are components useful for decreasing the viscosity of the glass during melting to promote the melting thereof and greatly increasing the thermal expansion. When the total content of these components exceeds 15%, not only the chemical durability of the glass is degraded, but also an alkali is liable to precipitate on the glass surface, so that the alkali may corrode an information recording layer such as a magnetic film. Further, the glass transition temperature may decrease, so that the heat resistance required may be no longer attained. When the total content the above components is less than 3%, the glass meltability decreases, or no predetermined thermal expansion property can be obtained, $Li_2O$ has a great effect on increasing the thermal expansion and increasing the Young's modulus. However, $Li_2O$ causes precipitation on a glass surface to a greater degree and has a large effect on decreasing the glass transition temperature, so that the content thereof is preferably adjusted to less than 1% (less than 1% by weight). It is more preferred to incorporate no $Li_2O$.

$Na_2O$ has a large effect on increasing the thermal expansion, but the effect is not so large as that of $K_2O$. Further, $Na_2O$ causes precipitation on a glass surface to a great extent, so that the content thereof is preferably 0 to 8%. It is more preferably 0 to 5%.

$K_2O$ is an essential component since it has a large effect on increasing the thermal expansion coefficient and causes precipitation on a glass surface to less degree. That is, $K_2O$ is an essential component for imparting the glass with a thermal expansion property and meltability that are desired and simultaneously controlling the alkali elution amount to a low level. However, when introduced in a large amount, $K_2O$ degrades the glass durability, and causes the heat resistance of the glass to deteriorate due to a decrease in glass transition temperature. The content of $K_2O$ is preferably in the range of 3 to 15% (more than 3% by weight), and more preferably 4 to 13%.

For the reason described above, the total content of $K_2O$, $Li_2O$ and $Na_2O$ is preferably in the range of 3 to 15%, more preferably in the range of 4 to 12%. $ZrO_2$ and $TiO_2$ are component for improving the glass in chemical durability and rigidity. When $ZrO_2$ and $TiO_2$ are added to the glass in a small amount, the glass is improved in durability, elastic modulus and fragility. However, the specific gravity of the glass sharply increases, and when they are added in a larger amount, the tendency of the glass to devitrification is intensified.

$ZrO_2$ is a component for increasing the Young's modulus. However, the specific gravity of the glass increases as well, so that the content thereof is preferably 0 to 12%, more preferably 0 to 10%.

While $TiO_2$ is inferior to $ZrO_2$ in the effect on increasing the Young's modulus, $TiO_2$ does not much cause the specific gravity to increase, so that the content thereof is preferably 0 to 10%, more preferably 0 to 8%.

The glass I has a composition substantially containing the above components.

In addition to the above components, the glass I may contain $As_2O_3$, $Sb_2O_3$, a fluoride, a chloride and $SO_3$ for improving the glass in meltability, clarification property and moldability. The content of these may be any amount so long as it is a proper amount in which they are used as a refining agent. However, the total content of these based on the glass composition is 2% by weight or less as an additive agent. The total content is more preferably 1% by weight or less. $Sb_2O_3$ and $As_2O_3$ have an excellent refining effect over any other refining agents above. In the glass for constituting a substrate for an information recording medium, fine bubbles remain in the glass if no sufficient de-foaming is carried out. When the surface of such a glass is polished and lapped, bubbles remaining in the glass come to appear on the surface and cause dents in the polished surface. The surface of the substrate for an information recording medium is required to have remarkably high smoothness, and products having such remaining bubbles are defective. It is therefore preferred to incorporate $Sb_2O_3$ and/or $As_2O_3$. The total content of $Sb_2O_3$ and $As2O_3$ based on the glass composition is preferably in the range of 0 to 2% by weight, more preferably 0.1 to 2% by weight, still more preferably in the range of 0.1 to 1% by weight. From the viewpoint of taking account of influences on environments, it is desirable not to incorporate any arsenic compound such as $As_2O_3$, and it is therefore much more preferred to incorporate $Sb_2O_3$ alone. When $Sb_2O_3$ alone is incorporated, the content thereof based on the glass composition is preferably 0 to 2% by weight, more preferably 0.1 to 2% by weight, still more preferably 0.1 to 1% by weight. A glass containing $As_2O_3$ or $Sb_2O_3$ is not suitable for making a float glass, since $As_2O_3$ or $Sb_2O_3$ in the glass reacts with a molten metal such as molten tin. It is therefore desirable to produce the substrate for an information recording medium not by a float-method but by a press-molding method.

A preferred composition can be selected by combining the above components in their corresponding preferred amount ranges. Above all, the glass composition particularly preferably contains more than 50% but not more than 67% of $SiO_2$, 2 to 12% of $Al_2O_3$ (provided that the total content of $SiO_2$ and $Al_2O_3$ is 57 to 79%), 3 to 20% of CaO, 14% or less of BaO, 0 to 10% of MgO, 0 to 10% of SrO, 0% of ZnO (provided that the total content of MgO, CaO, SrO, BaO and ZnO is 3 to 30%), 0% of $Li_2O$, 0 to 5% of $Na_2O$, 4 to 13% of $K_2O$ (provided that the total content of $K_2O$, $Li_2O$ and $Na_2O$ is 4 to 12%), 0 to 10% of $ZrO_2$ and 0 to 8% of $TiO_2$.

As the above glass I for constituting the glass substrate of the present invention, those glasses containing no $TiO_2$ are particularly excellent since roughening of the substrate surface can be decreased.

All the glasses explained above are excellent in glass meltability, and no non-melted matter is found in the glass, nor are crystal grains observed in the glass. That is, they are all amorphous glasses.

The glass I is suitable as a substrate material for an information recording medium, which substrate has no chemically strengthened layer.

The composition (to be referred to as "glass II" hereinafter) of a glass particularly preferred as a substrate for an information recording medium, which substrate has a chemically strengthened layer in a surface thereof, will be explained below.

The glass II is an alkali-metal-oxide-containing glass containing $SiO_2$, $Al_2O_3$, CaO, $Na_2O$, $K_2O$, BaO and $ZrO_2$ as essential components. In the glass II, a chemically strengthened layer is formed by carrying out ion-exchange between Na ion in the glass and K ion in a molten salt. The glass II therefore contains $Na_2O$ as an essential component.

As a first preferred embodiment, the glass II has a glass composition substantially containing, by mol %, more than 50% but not more than 70% (less than 58% by weight) of $SiO_2$, 1 to 10% (less than 20% by weight) of $Al_2O_3$, 2 to 25% (more than 6% by weight but less than 21% by weight) of CaO, 1 to 15% (more than 5% by weight) of BaO, 3 to 15% (more than 3% by weight) of $K_2O$, 0 to 3% (less than 1% by weight) of MgO, 0 to 15% (less than 4.5% by weight) of SrO, 0 to 10% of $TiO_2$, more than 0% but not more than 12% (more than 6% by weight) of $ZrO_2$, 0 to less than 1% (less than 1% by weight) of $Li_2O$, 1 to 8% of $Na_2O$ and 0 to 1% (less than 1% by weight) of ZnO, the total content of $SiO_2$, $Al_2O_3$ and $ZrO_2$ being more than 70% by weight.

The function and reason for limitation of the content of each component will be explained below, while explanations common to the glass I will be omitted.

BaO works to improve the thermal expansion and has an effect on improving the durability, so that the content thereof is adjusted to 1% or more. When an excess of BaO is introduced, the durability tends to be rather degraded. Further, BaO cause the specific gravity to increase to a great extent, so that the content thereof is preferably in the range of 1 to 15% (more than 5% by weight), and more preferably 1 to 14%.

$Na_2O$ and $K_2O$ are components useful for decreasing the viscosity of the glass during its melting to promote the melting of the glass and increasing the thermal expansion to a great extent. Particularly, $Na_2O$ is used for ion exchange, and sodium ion in the glass undergoes ion exchange with sodium ion in a molten salt and is replaced with the sodium ion, whereby the glass is chemically strengthened. However, when the total content of $Na_2O$ and $K_2O$ exceeds 16%, not only the chemical durability of the glass is degraded, but also an alkali comes to precipitate on a glass surface to a great extent, so that the alkali may corrode an information recording layer such as a magnetic film. In some cases, further, the glass transition temperature may decrease, and no necessary heat resistance can be attained. When the above total content is less than 4%, it is difficult to perform good chemical strengthening, the meltability of the glass decreases, or it is difficult to attain a predetermined thermal expansion property. It is therefore preferred to adjust the above total content to 4 to 16%.

$Na_2O$ is an essential component for enabling the chemical strengthening without decreasing the glass transition temperature. For performing good chemical strengthening, it is preferred to adjust the content thereof to at least 1%. $Na_2O$ has a large effect on increasing the thermal expansion, while the effect thereof is not so large as the effect of $K_2O$. Further, $Na_2O$ precipitates on a glass surface to a great extent, so that the content thereof is preferably 1 to 8%, more preferably 1 to 7%, still more preferably 1 to 5.

$Li_2O$ has a large effect on increasing the thermal expansion and the Young's modulus. However, it precipitates on a glass surface to a great degree, and it works to greatly decrease the glass transition temperature even when incorporated in a small amount. Therefore, it is preferred to control the content of $Li_2O$ to less than 1% (less than 1% by weight). It is preferred to incorporate no $Li_2O$.

Further, the total content of $SiO_2$, $Al_2O_3$ and $ZrO_2$ is adjusted to more than 70% by weight, preferably to 70.5% by weight or more. When the above total content is adjusted to more than 70% by weight, the glass can be improved in heat resistance.

While the above glass for chemical strengthening substantially contains the above components, the glass may contain $As_2O_3$, $Sb_2O_3$, a fluoride, a chloride and $SO_3$ for improving the glass in meltability, clarification property and moldability. The content of these may be any amount so long as it is a proper amount in which they are used as an refining agent. However, the total content of these based on the glass composition is 2% by weight or less as an additive agent. Of these, $Sb_2O_3$ and $As_2O_3$ have a high refining effect. It is therefore preferred to incorporate $Sb_2O_3$ and/or $As_2O_3$ for removing bubbles in the glass. The total content of $Sb_2O_3$ and $As_2O_3$ based on the glass composition is preferably in the range of 0 to 2% by weight, more preferably 0.1 to 2% by weight, still more preferably in the range of 0.1 to 1% by weight. From the viewpoint of taking account of influences on environments, it is desirable not to incorporate any arsenic compound such as $As_2O_3$, and it is therefore much more preferred to incorporate $Sb_2O_3$ alone. When $Sb_2O_3$ alone is incorporated, the content thereof based on the glass composition is preferably 0 to 2% by weight, more preferably 0.1 to 2% by weight, still more preferably 0.1 to 1% by weight.

More preferred glass compositions can be selected by combining more preferred amount ranges of the above components as required. Of these, the first preferred embodiment in the glass II more preferably has a glass composition substantially containing, by mol %, more than 50% but not more than 70% of $SiO_2$, 1 to 9% of $Al_2O_3$ (the total content of $SiO_2$ and $Al_2O_3$ is at least 57%), 3 to 25% of CaO, 1 to 14% of BaO, 1 to 5% of $Na_2O$, 3 to 15% of $K_2O$ (the total content of $Na_2O$ and $K_2O$ is 4 to 16%), 1 to 12% of $ZrO_2$, 0 to 3% of MgO, 0 to 15% of SrO, 0 to 1% of ZnO (the total content of MgO, CaO, SrO, BaO and ZnO is 3 to 30%) and 0 to 10% of $TiO_2$. Above all, a composition having a $ZrO_2$ content of 1 to 10%, and a composition having an $SiO_2$, $Al_2O_3$ and $ZrO_2$ total content of at least 70.5% by weight are more preferred.

The first preferred embodiment in the glass II particularly preferably has a glass composition substantially containing more than 50% but not more than 67% of $SiO_2$, 2 to 9% of $Al_2O_3$ (the total content of $SiO_2$ and $Al_2O_3$ is at least 57%), 3 to 20% of CaO, 1 to 14% of BaO, 1 to 5% of $Na_2O$, 4 to 13% of $K_2O$, 1 to 10% of $ZrO_2$ and 0 to 8% of $TiO_2$.

In the above particularly preferred composition, further present invention, the total content of MgO, CaO, SrO, BaO and ZnO is 3 to 25%.

The above refining agent may be incorporated into the above composition. For attaining excellent meltability and heat resistance while suppressing the alkali elution amount, it is desirable to limit the alkali metal oxide to $Na_2O$ and $K_2O$. As a refining agent, $Sb_2O_3$ is particularly preferred, and the content thereof based on the glass composition is preferably in the range of 0 to 1%.

Another preferred embodiment in the glass II is a glass having a glass composition containing more than 50% but not more than 70% (less than 58% by weight) of $SiO_2$, 1 to 10% (20% by weight or less) of $Al_2O_3$, 15 to 25% (more than 13% by weight but less than 21% by weight) of CaO, 1 to 15% (more than 5% by weight) of BaO, 3 to 15% (more than 3% by weight) of $K_2O$, 0 to 3% (less than 1% by weight) of MgO, 0 to 15% (less than 4.5% by weight) of SrO, 0 to 10% of $TiO_2$, more than 0% but not more than 12% (more than 6% by weight) of $ZrO_2$, 0 to less than 1% (less than 1% by weight) of $Li_2O$, 1 to 8% of $Na_2O$ and 0 to 1% (less than 1% by weight) of ZnO. The glass composition in the above preferred embodiment is the same as the glass composition in the first preferred embodiment of the glass II except for the total content of $SiO_2$, $Al_2O_3$ and $ZrO_2$ and the content of CaO. When the lower limit value of the content of CaO is increased, the high-temperature viscosity can be decreased without impairing the heat resistance even if the total content of $SiO_2$, $Al_2O_3$ and $ZrO_2$ is adjusted to 70% or less. The above glass composition is therefore particularly suitable for shaping a glass in a molten state into the form of a sheet. As a method of shaping a molten glass into the form of a sheet, a pressing method and a floating method are particularly preferred. The content of CaO is preferably in the range of at least 14% by weight.

Further, the glass II is excellent in meltability as well. No non-melted matter is found in the glass, nor are crystal grains observed in the glass.

In addition to the above high heat resistance and low alkali-elution property, the glass substrate of the present invention preferably has a thermal expansion property preferred as a substrate for an information recording medium, that is, an average linear thermal expansion coefficient ($\alpha$), measured at 100 to 300° C., of $70\times10^{-7}/°$ C. or more, and more preferably has an average linear thermal expansion coefficient, measured at 100 to 300° C., of $80\times10^{-7}/°$ C. The upper limit of the above average linear thermal expansion coefficient is generally approximately $120\times10^{-7}/°$ C.

Further, the glass substrate for an information recording medium preferably has a specific gravity of 3.5 or less. That is because the torque of the medium during rotation can be decreased. The specific gravity is more preferably 3.2 or less. Further, for attaining high stability when the information recording medium is rotated at a high speed, the glass substrate preferably has high rigidity, that is, has a Young's modulus of 72 GPa or more. For improving the devitrification resistance, the liquidus temperature of the glass composition is preferably 1,200° C. or lower, more preferably 1,050° C. or lower.

As already described, the glass substrate for an information recording medium, provided by the present invention, includes a glass substrate having no chemically strengthened layer in a surface and a glass substrate having a chemically strengthened layer in a surface. The substrate for an information recording medium, which substrate has a chemically strengthened layer in a surface, will be explained below.

The substrate for an information recording medium, which substrate has a chemically strengthened layer in a surface, is effective for preventing the breakage of the substrate since the substrate is imparted with high strength by the chemical strengthening. Further, the above substrate can produce an effect that it can retain a required strength when a film is formed thereon and subjected to high-temperature treatment such as annealing at a high temperature, and that the substrate does not easily break when exposed to a sharp temperature change during the above high-temperature treatment since it has high strength, so that handling of such a substrate is easy.

The above substrate includes, for example, a glass substrate having a compression stress layer formed in its glass surface (chemically strengthened substrate), obtained by immersing a disk-shaped glass having a central hole or a central-hole-free disk-shaped glass in an alkali metal molten salt, preferably a potassium-containing molten salt (e.g., a potassium nitrate molten salt) and thereby carrying ion exchange between alkali metal ion in the glass (particularly near the glass surface) and an alkali metal ion in the molten salt.

After heated at 570° C. for 2 hours, the glass material for constituting the glass substrate for an information recording material which glass substrate has a chemically strengthened layer in its surface preferably has a flexural strength of at least 15 $kgf/mm^2$, more preferably at least 17 $kgf/mm^2$, still more preferably at least 20 $kgf/mm^2$. For easily obtaining a glass having high stability while the above flexural strength is in the above range, the above flexural strength can be adjusted to 100 $kgf/mm^2$ or less. In the above substrate, the relaxation of the compression stress layer formed by the chemical strengthening near the glass surface is small after high-temperature treatment, so that there can be provided a substrate for an information recording medium, which substrate can retain high strength even after high-temperature treatment. Concerning the above flexural strength, the heating of the above substrate as a sample at 570° C. for 2 hours is carried out in atmosphere.

Further, the glass material for constituting the substrate for an information recording medium which substrate has a chemically strengthened layer in its surface preferably has an (fT−fb)/fb value of at least 0.5, more preferably at least 0.52, in which fb is a flexural strength that the above glass material has before the above chemical strengthening and fT is a flexural strength that the glass material has after the glass material that is chemically strengthened as described above is held at a temperature T[° C.] (T is any temperature from 20 to 570° C.) for 2 hours.

When the glass material satisfies the above condition, there can be provided a substrate that has sufficient flexural strength against the formation of an information recording layer and heat treatment, such as the formation of an information recording layer and heat treatment in the production of a perpendicular-magnetic-recording-mode information recording medium. The above heating at a temperature of T for 2 hours is carried out in atmosphere.

For imparting the glass material with higher stability as a glass and enabling better chemical strengthening, more preferably, the (fT−fb)/fb value is adjusted to 9 or less. Whether the (fT−fb)/fb value is a predetermined value or greater can be determined as follows. A substrate is measured for flexural strength fb, the substrate that is chemically strengthened is measured for a flexural strength f570 after the chemically strengthened substrate is held at 570° C. for 2 hours, a value of (f570−fb)/fb is calculated, and it is determined whether or not the value is the above predetermined value or greater. Whether the (fT−fb)/fb value is a predetermined value or smaller can be determined as follows. A substrate is measured for flexural strength fb, the substrate that is chemically strengthened is measured for a flexural strength f570 after the chemically strengthened substrate is held at 570° C. for 2 hours, a value of (f570−fb)/fb is calculated, and it is determined whether or not the value is the above predetermined value or smaller.

Further, with regard to a flexural strength f20 at 20° C., the value of (f20−fb)/fb is preferably at least 1, more preferably at least 1.2. For imparting the substrate with higher stability as a glass and enabling better chemical strengthening, more preferably, the value of (f20−fb)/fb is adjusted to 9 or less.

The above flexural strength is measured as follows. First, a 40 mm×10 mm×1 mm sheet-shaped sample made of a glass material for constituting a substrate for an information recording medium is prepared, and the sample is measured for the above flexural strengths with a three-point flexural tester at a span of 30 mm at a load application rate of 0.5 mm/second. Before the measurement, the above sheet-shaped sample has end and side surfaces (40 mm×1 mm surfaces and 10 mm×1 mm surfaces, totaling four surfaces) and main surfaces (two 40 mm×10 mm surfaces) polished. Desirably, the above end and side surfaces are optically polished, and more desirably, the main surfaces are also optically polished or polished so as to be in a polished state equivalent to the main surface (on which an information recording layer is to be formed) of a substrate for an information recording medium.

As a glass for constituting a substrate for the above information recording medium which substrate has a chemically strengthened layer in its surface, the glass 1 or the glass II are preferred, and the glass II is particularly preferred.

Further, the substrate for an information recording medium, provided by the present invention, has a high glass transition temperature and a low alkali-elution property, so that it is suitable for a substrate for an information recording medium which substrate is obtained by high-temperature treatment such as heat treatment at a high temperature of 400 to 600° C. The substrate of the present invention is particularly suitably applied to a substrate for a perpendicular-magnetic-recording-mode information recording medium which substrate is subjected to high-temperature sputtering and high-temperature annealing.

A substrate for an information recording medium which substrate has high heat resistance and can retain sufficient smoothness after its immersion in water will be explained below. The glass transition temperature (Tg) of the amorphous glass for constituting the above substrate is 620° C. or higher, preferably 650° C. or higher, more preferably 680° C. or higher, still more preferably 700° C. or higher. While the upper limit of the above glass transition temperature is not specially limited, it is generally about 900° C., desirably 800° C. or lower, as is already explained. The feature of the above glass for the substrate is that it contains an alkali metal oxide but contains no $TiO_2$. The above alkali metal oxide is preferably represented by $Na_2O$ and/or $K_2O$, and preferably represented by $Na_2O$ and $K_2O$.

As already explained, the information recording medium having a substrate formed of an alkali-metal-oxide-containing glass has a problem that an alkali metal in the substrate corrodes a thin film layer including an information recording layer. For decreasing the alkali metal ion concentration near the substrate surface, it is thinkable to employ a method in which the substrate is immersed in pure water to elute alkali metal ion into the pure water. The above method is also effective for a glass whose alkali elution amount is remarkably small. When a glass contains $TiO_2$, a very small amount of titanium component that is being eluted into the pure water from the glass surface and an alkali metal react with each other to form a sparingly soluble foreign matter, and the foreign matter adheres to the glass surface. The adherence of the foreign matter impairs the smoothness of the substrate surface, and it is therefore imperative to prevent the occurrence of such a foreign matter. The glass for constituting the above substrate therefore precludes $TiO_2$. The above glass is preferably a glass that is included in the glass I but contains no $TiO_2$ or a glass that is included in the glass II but contains no $TiO_2$. The substrate for an information recording medium which substrate is formed of the above glass may be a glass having a chemically strengthened layer or a glass having no chemically strengthened layer.

The substrate formed of the above glass may be immersed in pure water to decrease the alkali metal ion concentration near the surface, so that the corrosion of an information recording layer by alkali elution can be decreased.

The method of producing the substrate for an information recording medium will be explained below. As the method, a known method can be employed as required. For example, predetermined amounts of raw materials for a glass are melted by a high-temperature melting method in which the raw materials are melted in air or in an inert gas atmosphere and homogenized by bubbling or stirring, and a molten glass is shaped into a sheet glass by a known pressing method, down drawing method or floating method, followed by processing to make a disk, making a central hole, processing of inner and outer circumferential side surfaces, polishing and lapping, whereby there is formed a substrate for an information recording medium which substrate has a desired size and form. In the polishing and lapping, lapping with an abrasive or diamond pellets and polishing with a polishing material such as cerium oxide are carried out, whereby a surface accuracy, for example, in the range of 0.1 to 0.6 nm can be attained. After the above processing, the substrate surface is washed with a wash liquid. Since the alkali elution amount is at a remarkably low level, the smoothness and cleanness of the substrate surface are not impaired by the washing. Further, when the washed substrate is exposed in atmosphere, surface roughening caused by alkali elution does not take place. According to the substrate for an information recording medium, provided by the present invention, there can be provided a substrate that is suitable for high-temperature heat treatment and causes less elution of alkali metal ion. For example, when the above substrate is used as a substrate for a magnetic recording medium, there can be provided an excellent perpendicular-recording-mode magnetic recording medium, and it is made possible to provide a magnetic recording medium having a higher recording density (e.g., 1 TBit/$(2.5 cm)^2$ than the surface recording density 100 GBit/$(2.5 cm)^2$ of a conventional longitudinal-magnetic-recording-mode magnetic recording medium.

When a chemically strengthened layer is formed, the glass substrate that is polished and lapped is immersed in a molten salt containing alkali metal ion, preferably potassium ion, as is already described.

Further, the substrate may be immersed in pure water to decrease alkali metal ion in the vicinity of the substrate surface.

When a glass substrate containing $Sb_2O_3$ or $As_2O_3$ is produced, it is preferred to employ a method of press-molding a molten glass or a glass in a softened state for the reason described already, and a float-method is not suitable.

The information recording medium of the present invention and the process for producing the information recording medium will be explained below.

The information recording medium of the present invention comprising an information recording layer formed on the above glass substrate for an information recording medium. When a magnetic recording medium is formed from the above glass substrate, an undercoat layer, a magnetic layer, a protective layer and a lubricant layer are consecutively formed on the glass substrate. Although not specially limited, the magnetic layer (information recording layer) is preferably a magnetic layer formed of a Co—Cr system, a Co—Cr—Pt system, a Co—Ni—Cr system, a Co—Ni—Pt system, a Co—Ni—Cr—Pt system or a Co—Cr—Ta system. The undercoat layer includes an Ni layer, an Ni—P layer and a Cr layer. The protective layer includes a carbon film, and a lubricating material containing a perfluoropolyether or the like may be used for forming the lubricant layer.

The substrate for an information recording medium, provided by the present invention, is suitable for a perpendicular-magnetic-recording-mode magnetic recording medium. The layer constitution of the perpendicular-magnetic-recording-mode magnetic recording medium includes a single-layer film having a perpendicular magnetic recording layer formed on a non-magnetic substrate, a double-layer film having a soft magnetic layer and a magnetic recording layer stacked consecutively and a three-layer film having a hard magnetic layer, a soft magnetic layer and a magnetic recording layer stacked consecutively. Of these, a double-layer film and a three-layer film are preferred since they are more suitable for higher-density recording and maintenance of magnetic moment stability than the single-layer film.

For improving the properties of the above multi-layered-magnetic-film perpendicular magnetic recording medium, it is required to form the film by a high-temperature sputtering machine and it is required to heat-treat the formed film at a high temperature at 400 to 600° C. (annealing). The substrate for an information recording medium, provided by the present invention, is formed of the glass having a glass transition temperature (Tg) of 650° C. or higher, so that the substrate can retain flatness without deforming under the above heat treatment at a high temperature. Further, the alkali-elution amount of the substrate is small, so that it is made possible to prevent the corrosion of an information recording layer formed on the substrate caused by the precipitation of an alkali metal from the substrate.

EXAMPLES

The present invention will be explained more in detail with reference to Examples hereinafter, while the present invention shall not be limited by these Examples.

Examples 1-16 and Comparative Example 1

$SiO_2$, $Al_2O_3$, $Al(OH)_3$, MgO, $Mg(OH)_2$, $MgCO_3$, $CaCO_3$, $SrCO_3$, $BaCO_3$, ZnO, $Li_2CO_3$, $Na_2CO_3$, $K_2CO_3$, $TiO_2$, $ZrO_2$, and the like as starting materials were weighed so as to obtain a glass having a weight of 300 to 1,500 g and corresponding to the glass I having a composition shown in Table 1, 2 or 3 and fully mixed to prepare a formulated batch. The formulated batch was placed in a platinum crucible and melted in air at a temperature of 1,400 to 1,600° C. for approximately 3 to 8 hours. The resultant molten glass was allowed to flow into a carbon mold having a size of 40×40×20 mm, allowed to cool to a glass transition temperature and, immediately thereafter, placed in an annealing furnace. The glass was held therein for 1 hour and allowed to cool to room temperature in the furnace. In the thus-obtained glass, there was precipitated no crystal that was observable through a microscope. Further, the glass had high homogeneity, had no non-melted substance observable and hence showed high meltability.

The thus-obtained glass was machined to prepare 40×20×15 mm, 5φ×20 mm and 30×30×2 mm samples for evaluations of physical properties, and the samples were measured for physical properties according to the following methods. Tables 1 to 3 show the glass compositions (mol %) of Examples 1 to 16 and Comparative Example 1 and results of the measurements of their physical properties. Further, Tables 4 to 6 show the glass compositions (wt %) of Examples 1 to 16 and Comparative Example 1 calculated based on the glass compositions (mol %) shown in tables 1 to 3.

Further, glasses having the glass compositions in Examples 1 to 16 and further containing 0.5% by weight, based on the glass composition, of $Sb_2O_3$ were prepared, and these glasses also gave evaluation results similar to those shown in Tables 1 to 3. When these glasses containing $Sb_2O_3$ were observed through a microscope, no bubbles were observed in the glasses.

(1) Glass Transition Temperature (Tg)

A 5 mmφ×20 mm sample was measured with a thermo-mechanical analyzer (TMA8140) supplied by Rigakusha at a temperature elevation rate of +4° C./minute. $SiO_2$ was used as a standard sample. The glass transition temperature corresponds to a temperature at which the glass comes to have a viscosity of 1,013.3 dpa·s.

(2) Average Linear Thermal Expansion Coefficient

The average linear thermal expansion coefficient means an average linear thermal expansion coefficient at 100 to 300° C., and the measurement thereof was made during the measurement of the glass transition temperature.

(3) Specific Gravity

A 40×20×15 mm sample was measured according to an Archimedean method.

(4) Young's Modulus

A 40×20×15 mm sample was measured according to an ultrasonic method.

(5) Alkali Elution Amount

A 30×30×2 mm sample ultrasonically washed in an ethanol bath was placed in a polypropylene container that had been washed with an acid beforehand, and the sample was measured according to the method described in the present specification.

TABLE 1

|  |  | Examples |  |  |  |  |  |
|---|---|---|---|---|---|---|---|
|  |  | 1 | 2 | 3 | 4 | 5 | 6 |
| Glass Composition (mol %) | $SiO_2$ | 50 | 50 | 50 | 60 | 55 | 64 |
|  | $Al_2O_3$ | 10 | 10 | 10 | 5 | 5 | 3 |
|  | ($SiO_2 + Al_2O_3$) | (60) | (60) | (60) | (65) | (60) | (67) |
|  | MgO | 5 | — | 10 | 3 | 3 | 3 |
|  | CaO | 20 | 20 | 10 | 10 | 15 | 15 |
|  | SrO | — | 5 | — | 3 | 3 | 3 |
|  | BaO | 5 | 5 | 10 | 5 | 5 | 5 |
|  | ZnO | — | — | — | — | — | — |
|  | (RO) | (30) | (30) | (30) | (21) | (26) | (26) |
|  | $Li_2O$ | — | — | — | — | — | — |
|  | $Na_2O$ | — | — | — | — | — | — |
|  | $K_2O$ | 5 | 5 | 5 | 7 | 7 | 7 |
|  | ($R'_2O$) | (5) | (5) | (5) | (7) | (7) | (7) |
|  | $ZrO_2$ | — | — | — | — | 7 | — |
|  | $TiO_2$ | 5 | 5 | 5 | 7 | — | — |
|  | Total | 100 | 100 | 100 | 100 | 100 | 100 |

TABLE 1-continued

|  |  | Examples | | | | | |
| --- | --- | --- | --- | --- | --- | --- | --- |
|  |  | 1 | 2 | 3 | 4 | 5 | 6 |
| Physical properties | Glass transition temperature (° C.) | 709 | 714 | 690 | 683 | 735 | 665 |
|  | Average linear thermal expansion coefficient [100-300° C.] ($\times 10^{-7}/$° C.) | 82.9 | 82.8 | 80.8 | 80.6 | 86.0 | 88.5 |
|  | Specific gravity | 2.88 | 2.98 | 3.02 | 2.84 | 3.03 | 2.80 |
|  | Young's modulus (GPa) | 85.2 | 84.0 | 83.7 | 76.8 | 86.30 | 75.0 |
|  | Alkali-elution amount ($\mu$mol/cm$^2$) | 0.032 | 0.029 | 0.08 | 0.021 | 0.015 | 0.115 |

RO = MgO + CaO + SrO + BaO + ZnO
R'$_2$O = Li$_2$O + Na$_2$O + K$_2$O

TABLE 2

|  |  | Examples | | | | | |
| --- | --- | --- | --- | --- | --- | --- | --- |
|  |  | 7 | 8 | 9 | 10 | 11 | 12 |
| Glass Composition (mol %) | SiO$_2$ | 60 | 60 | 50 | 57 | 57 | 57 |
|  | Al$_2$O$_3$ | 5 | 5 | 12 | 5 | 5 | 5 |
|  | (SiO$_2$ + Al$_2$O$_3$) | (65) | (65) | (62) | (62) | (62) | (62) |
|  | MgO | 3 | 3 | 5 | 3 | 3 | 3 |
|  | CaO | 15 | 15 | 13 | 15 | 13 | 13 |
|  | SrO | — | 3 | 5 | 3 | 3 | — |
|  | BaO | 5 | 5 | 5 | 5 | 5 | 8 |
|  | ZnO | — | — | — | — | — | — |
|  | (RO) | (23) | (26) | (28) | (26) | (24) | (24) |
|  | Li$_2$O | — | — | — | — | — | — |
|  | Na$_2$O | — | — | — | — | — | — |
|  | K$_2$O | 9 | 9 | 10 | 7 | 9 | 9 |
|  | (R'$_2$O) | (9) | (9) | (10) | (7) | (9) | (9) |
|  | ZrO$_2$ | — | — | — | 5 | 5 | 5 |
|  | TiO$_2$ | 3 | — | — | — | — | — |
|  | Total | 100 | 100 | 100 | 100 | 100 | 100 |
| Physical Properties | Glass transition temperature (° C.) | 669 | 662 | 687 | 727 | 714 | 708 |
|  | Average linear thermal expansion coefficient [100-300° C.] ($\times 10^{-7}/$° C.) | 90.7 | 96.5 | 94.9 | 88.0 | 87.6 | 89.7 |
|  | Specific gravity | 2.77 | 2.81 | 2.86 | 2.97 | 2.94 | 2.99 |
|  | Young's modulus (GPa) | 75.1 | 74.7 | 78.7 | 83.5 | 81.4 | 80.9 |
|  | Alkali-elution amount ($\mu$mol/cm$^2$) | 0.021 | 0.065 | 0.041 | 0.018 | 0.014 | 0.013 |

RO = MgO + CaO + SrO + BaO + ZnO
R'$_2$O = Li$_2$O + Na$_2$O + K$_2$O

TABLE 3

|  |  | Examples | | | | CEx. |
| --- | --- | --- | --- | --- | --- | --- |
|  |  | 13 | 14 | 15 | 16 | 1 |
| Glass Composition (mol %) | SiO$_2$ | 57 | 58 | 58 | 58 | 73 |
|  | Al$_2$O$_3$ | 5 | 5 | 7 | 5 | 0.6 |
|  | (SiO$_2$ + Al$_2$O$_3$) | (62) | (63) | (65) | (63) | 73.6 |
|  | MgO | 1 | 1 | — | — | — |
|  | CaO | 15 | 15 | 12 | 12 | 7 |
|  | SrO | — | — | — | — | — |
|  | BaO | 8 | 8 | 8 | 8 | — |
|  | ZnO | — | — | — | — | 2 |
|  | (RO) | (24) | (24) | (20) | (20) | — |
|  | Li$_2$O | — | — | — | — | — |
|  | Na$_2$O | — | — | — | — | 9 |
|  | K$_2$O | 9 | 8 | 10 | 10 | 9 |
|  | (R'$_2$O) | (9) | (8) | (10) | (10) | — |
|  | ZrO$_2$ | 5 | 5 | 5 | 7 | — |
|  | TiO$_2$ | — | — | — | — | — |
|  | Total | 100 | 100 | 100 | 100 | — |
| Physical Properties | Glass transition temperature (° C.) | 715 | 716 | 716 | 745 | 554 |
|  | Average linear thermal expansion coefficient [100-300° C.] (×10$^{-7}$/° C.) | 90.0 | 86.7 | 87.9 | 84.4 | — |
|  | Specific gravity | 3.00 | 2.99 | 2.95 | 3.01 | 2.6 |
|  | Young's modulus (GPa) | 80.8 | 80.9 | 78.6 | 81.0 | 79 |
|  | Alkali-elution amount (μmol/cm$^2$) | 0.014 | 0.014 | 0.021 | 0.017 | >0.2 |

CEx. = Comparative Example
RO = MgO + CaO + SrO + BaO + ZnO
R'$_2$O = Li$_2$O + Na$_2$O + K$_2$O

TABLE 4

|  |  | Examples | | | | | |
| --- | --- | --- | --- | --- | --- | --- | --- |
|  |  | 1 | 2 | 3 | 4 | 5 | 6 |
| Glass Composition (wt %) | SiO$_2$ | 43.02 | 41.15 | 40.65 | 50.83 | 44.81 | 56.14 |
|  | Al$_2$O$_3$ | 14.60 | 13.97 | 13.80 | 7.19 | 6.91 | 4.47 |
|  | (SiO$_2$ + Al$_2$O$_3$) | (57.62) | (55.12) | (54.45) | (58.02) | (51.72) | (60.61) |
|  | MgO | 2.88 | — | 5.45 | 1.70 | 1.64 | 1.76 |
|  | CaO | 16.06 | 15.37 | 7.59 | 7.91 | 11.41 | 12.28 |
|  | SrO | — | 7.09 | — | 4.38 | 4.21 | 4.54 |
|  | BaO | 10.97 | 10.50 | 20.74 | 10.81 | 10.39 | 11.19 |
|  | ZnO | — | — | — | — | — | — |
|  | (RO) | (29.91) | (32.96) | (33.78) | (24.80) | (27.65) | (29.77) |
|  | Li$_2$O | — | — | — | — | — | — |
|  | Na$_2$O | — | — | — | — | — | — |
|  | K$_2$O | 6.74 | 6.45 | 6.37 | 9.30 | 8.94 | 9.62 |
|  | (R'$_2$O) | (6.74) | (6.45) | (6.37) | (9.30) | (8.94) | (9.62) |
|  | TiO$_2$ | 5.72 | 5.47 | 5.40 | 7.88 | — | — |
|  | ZrO$_2$ | — | — | — | — | 11.69 | — |
|  | 合計 | 100 | 100 | 100 | 100 | 100 | 100 |

TABLE 5

|  |  | Examples | | | | | |
| --- | --- | --- | --- | --- | --- | --- | --- |
|  |  | 7 | 8 | 9 | 10 | 11 | 12 |
| Glass Composition (wt %) | SiO$_2$ | 52.01 | 51.48 | 40.69 | 47.24 | 46.60 | 45.90 |
|  | Al$_2$O$_3$ | 7.36 | 7.28 | 16.57 | 7.03 | 7.00 | 6.80 |
|  | (SiO$_2$ + Al$_2$O$_3$) | (59.38) | (58.77) | (57.25) | (54.28) | (53.80) | (52.60) |
|  | MgO | 1.74 | 1.73 | 2.73 | 1.67 | 1.70 | 1.60 |
|  | CaO | 12.14 | 12.02 | 9.87 | 11.61 | 10.0 | 9.80 |
|  | SrO | — | 4.44 | 7.01 | 4.29 | 4.20 | — |
|  | BaO | 11.06 | 10.94 | 10.38 | 10.57 | 10.50 | 16.40 |
|  | ZnO | — | — | — | — | — | — |
|  | (RO) | (24.94) | (29.13) | (29.99) | (28.14) | (26.40) | (27.80) |
|  | Li$_2$O | — | — | — | — | — | — |
|  | Na$_2$O | — | — | — | — | — | — |
|  | K$_2$O | 12.23 | 12.11 | 12.75 | 9.09 | 11.60 | 11.30 |
|  | (R'$_2$O) | (12.23) | (12.11) | (12.75) | (9.09) | (11.60) | (11.30) |
|  | TiO$_2$ | 3.46 | — | — | — | — | — |
|  | ZrO$_2$ | — | — | — | 8.50 | 8.40 | 8.20 |
|  | 合計 | 100 | 100 | 100 | 100 | 100 | 100 |

TABLE 6

|  |  | Examples | | | | CEx. 1 |
|---|---|---|---|---|---|---|
|  |  | 13 | 14 | 15 | 16 | |
| Glass | $SiO_2$ | 45.60 | 46.60 | 45.50 | 45.30 | 68.45 |
| Composition | $Al_2O_3$ | 6.80 | 6.80 | 9.30 | 6.60 | 0.95 |
| (wt %) | ($SiO_2$ + $Al_2O_3$) | 52.40 | 53.40 | 54.80 | 51.90 | 69.40 |
|  | MgO | 0.50 | 0.50 | — | — | — |
|  | CaO | 11.20 | 11.30 | 8.80 | 8.70 | 6.13 |
|  | SrO | — | — | — | — | — |
|  | BaO | 16.30 | 16.40 | 16.00 | 15.90 | — |
|  | ZnO | — | — | — | — | 2.54 |
|  | (RO) | 28.00 | 28.20 | 24.80 | 24.60 | 8.67 |
|  | $Li_2O$ | — | — | — | — | — |
|  | $Na_2O$ | — | — | — | — | 8.71 |
|  | $K_2O$ | 11.30 | 10.10 | 12.30 | 12.20 | 13.23 |
|  | ($R'_2O$) | 11.30 | 10.10 | 12.30 | 12.20 | 21.94 |
|  | $TiO_2$ | — | — | — | — | — |
|  | $ZrO_2$ | 8.20 | 8.20 | 8.00 | 11.20 | — |
|  | 合計 | 100 | 100 | 100 | 100 | |

CEx. = Comparative Example

As shown in Tables 1 to 3, the glasses shown in Examples 1 to 16 had high glass transition temperatures of 650° C. or higher, had average linear thermal expansion coefficients of $80 \times 10^{-7}/°$ C. or more at 100 to 300° C. and showed their alkali-elution amounts of 0.2 μmol/cm² or less. Further, these glasses also had high Young's moduli of 72 GPa or high rigidity.

The glasses in Examples were measured for the above properties, and then melts of the above glasses and melts of glasses prepared by adding 0.5% by weight, based on each glass composition, of $Sb_2O_3$ to such glasses and homogenizing the mixtures were respectively supplied to a press mold, to press-shape them to the form of a disk each. Besides the press-molding, for example, a glass disk may be formed by a method called a float-method. However, when $Sb_2O_3$ is incorporated, the float-method is unsuitable. The shaped glass disks were gradually cooled, and then surfaces thereof were lapped, followed by processing of central holes, outer diameters and end surfaces. Then, each main surface was further lapped and then polished, to complete flat and smooth surfaces. The thus-obtained substrates for an information recording medium were washed with a wash liquid. Since the alkali-elution amounts of the glasses constituting the substrates were at a remarkably low level, surface roughening of the substrates during washing during the washing was prevented. The main surfaces of the glass substrates after washed had a center-line surface roughness of 0.1 to 0.6 nm. As is already explained, each of the washed substrates may be immersed in pure water to decrease an alkali metal ion concentration in the substrate surface.

The center-line surface roughness Ra of each substrate was measured with an atomic force microscope (AFM).

Perpendicular-recording-mode magnetic disks were fabricated from the washed and dried glass substrates. In the formation of a magnetic recording layer, there were fabricated perpendicular-recording-mode magnetic disks of two types; magnetic disks having a two-layer film formed by consecutively stacking a soft magnetic layer and a magnetic recording layer, and magnetic disks having three-layer film formed by consecutively stacking a hard magnetic layer, a soft magnetic layer and a magnetic recording layer. In the above step, the magnetic recording layers were heat-treated at a high temperature of 400 to 600° C., and all the substrates retained high flatness without being deformed, since they had a glass transition temperature (Tg) of 650° C. or higher or high heat resistance.

In contrast, the substrate formed of a glass in Comparative Example 1 had a glass transition temperature of as low as 554° C., and the substrate was deformed under high-temperature treatment in the sputtering step of a magnetic recording layer in the process of producing the magnetic recording substrate, so that the substrate was no longer usable as a substrate for a perpendicular-recording-mode magnetic disk.

Examples 17-27

$SiO_2$, $Al_2O_3$, $Al(OH)_3$, $CaCO_3$, $BaCO_3$, $Na_2CO_3$, $K_2CO_3$, $TiO_2$, $ZrO_2$, and the like as starting materials were weighed so as to obtain a glass having a weight of 300 to 1,500 g and corresponding to the glass II having a composition in Examples 17 to 27 shown in Table 7, 8 or 9 and fully mixed to prepare a formulated batch. The formulated batch was placed in a platinum crucible and melted in air at a temperature of 1,400 to 1,600° C. for approximately 3 to 8 hours. The resultant molten glass was allowed to flow into a carbon mold having a size of 40×40×20 mm, allowed to cool to a glass transition temperature and, immediately thereafter, placed in an annealing furnace. The glass was held therein for 1 hour and allowed to cool to room temperature in the furnace. When the thus-obtained glass was observed through a microscope, no crystal was observable in the glass. Further, it was seen that the glass had high homogeneity, had no non-melted substance observable and hence showed high meltability. Further, there were prepared glasses containing 0.5% by weight, based on each glass composition, of $Sb_2O_3$ added to each of the glasses in Examples 17 to 27. When the glasses were observed through a microscope, none of crystal grains, non-melted substances and bubbles were found in each glass.

Each of the thus-obtained glass samples was measured for a glass transition temperature, a sag temperature, an average linear expansion coefficient at 30 to 300° C., an average linear expansion coefficient at 100 to 300° C., a specific gravity, a Young's modulus, a rigidity, a Poisson ratio, a specific elastic modulus, a liquidus temperature, a flexural strength f0 before chemical strengthening, a flexural strength f1 after chemical strengthening and a flexural strength f2 after the chemical strengthening was followed by heating at 570° C. in atmosphere for 2 hours. The chemical strengthening was carried out by immersing each sample in a potassium nitrate molten salt having a predetermined temperature for a predetermined period of time. Tables 7, 8 and 9 show conditions of the chemical strengthening and glass properties in Examples 12 to 27 together with the glass compositions (mol %) in Examples 12 to 17. Further, Tables 10 and 11 show the glass compositions (wt %) in Examples 12 to 17 calculated based on the glass compositions (mol %) shown in Tables 7 to 9.

The glasses containing $Sb_2O_3$ also had properties shown in FIGS. 4 and 5. Examples 17 to 21 used glasses having the same compositions, and the glasses were chemically strengthened under different conditions.

Concerning those properties of which the measurement methods are described in Examples 1 to 16, the methods of measuring such properties are the same as those in Examples 1 to 16. Sag temperatures, rigidity, Poisson ratios, specific elastic moduli, liquidus temperatures and flexural strengths were measured as follows.

(6) Sag Temperature

A 5 mmφ×20 mm glass sample was prepared from each of the above glass samples and measured for a sag temperature with a thermo-mechanical analyzer (TMA8140) supplied by Rigakusha at a temperature elevation rate of +4° C./minute. SiO$_2$ was used as a standard sample.

(7) Rigidity, Poisson Ratio

A 40×20×15 mm sample was prepared from each of the above glass samples and measured by an ultrasonic method.

(8) Specific Elastic Modulus

Calculated from Young's modulus and specific gravity values on the basis of the equation (specific elastic modulus=Young's modulus/specific gravity).

(9) Liquidus Temperature

A glass sample was placed in a platinum container with a cover, entirely melted at 1,500° C., then the container with the sample in it was held in a furnace having a predetermined temperature and taken out after a predetermined period of time, and the sample was observed through an optical microscope for a crystal formed in the glass. A lowest temperature at which no crystal was formed was taken as a liquidus temperature.

(10) Flexural Strength

A 40×10×1 mm sheet-shaped sample was prepared from each of the above glass samples, long end surfaces (two 40 mm×1 mm surfaces) were polished to round them, and two main surfaces and the other end surfaces were polished. Thus-prepared sample was measured with a three-point flexural tester at a span of 30 mm at a load application rate of 0.5 mm/second.

TABLE 7

|  |  | Ex. 17 | Ex. 18 | Ex. 19 | Ex. 20 | Ex. 21 |
|---|---|---|---|---|---|---|
| Glass Composition (mol %) | SiO$_2$ | 63.0 | 63.0 | 63.0 | 63.0 | 63.0 |
|  | Al$_2$O$_3$ | 4.0 | 4.0 | 4.0 | 4.0 | 4.0 |
|  | CaO | 13.0 | 13.0 | 13.0 | 13.0 | 13.0 |
|  | BaO | 3.0 | 3.0 | 3.0 | 3.0 | 3.0 |
|  | CaO + BaO | 16.0 | 16.0 | 16.0 | 16.0 | 16.0 |
|  | Na$_2$O | 4.0 | 4.0 | 4.0 | 4.0 | 4.0 |
|  | K$_2$O | 5.0 | 5.0 | 5.0 | 5.0 | 5.0 |
|  | Na$_2$O + K$_2$O | 9.0 | 9.0 | 9.0 | 9.0 | 9.0 |
|  | TiO$_2$ | 4.0 | 4.0 | 4.0 | 4.0 | 4.0 |
|  | ZrO$_2$ | 4.0 | 4.0 | 4.0 | 4.0 | 4.0 |
|  | Total | 100 | 100 | 100 | 100 | 100 |
| Glass transition temperature [° C.] | | 669 | 669 | 669 | 669 | 669 |
| Sag temperature [° C.] | | 746 | 746 | 746 | 746 | 746 |
| Alkali-elution amount [µmol/cm$^2$] | | 0.015 | 0.014 | 0.015 | 0.018 | 0.020 |
| Average linear thermal expansion coefficient at 30-300° C. [×10$^{-7}$K$^{-1}$] | | 79.5 | 79.5 | 79.5 | 79.5 | 79.5 |
| Average linear thermal expansion coefficient at 100-300° C. [×10$^{-7}$K$^{-1}$] | | 83.3 | 83.3 | 83.3 | 83.3 | 83.3 |
| Specific gravity | | 2.79 | 2.79 | 2.79 | 2.79 | 2.79 |
| Young's modulus [GPa] | | 82.7 | 82.7 | 82.7 | 82.7 | 82.7 |
| Rigidity [GPa] | | 33.4 | 33.4 | 33.4 | 33.4 | 33.4 |
| Poisson ratio | | 0.24 | 0.24 | 0.24 | 0.24 | 0.24 |
| Specific elastic modulus [×10$^6$ Nm/kg] | | 29.6 | 29.6 | 29.6 | 29.6 | 29.6 |
| Liquidus temperature [° C.] | | 1050 or less | 1050 or less | 1050 or less | 1050 or less | 1050 or less |
| Ion-exchange temperature [° C.] | | 400 | 420 | 450 | 470 | 500 |
| Ion-exchange time period [hour] | | 3 | 3 | 3 | 3 | 3 |
| FS* | Before chemical strengthening f$_b$ | 12.0 | 12.0 | 12.0 | 12.0 | 12.0 |
|  | After chemical strengthening f$_{20}$ | 28.4 | 30.7 | 37.2 | 40.9 | 45.3 |
|  | After heating at 570° C. for 2 hours f$_{570}$ | 18.6 | 22.3 | 24.5 | 25.9 | 31.1 |
|  | (f$_{570}$ − f$_b$)/f$_b$ | 0.550 | 0.858 | 1.04 | 1.16 | 1.59 |
|  | (f$_{20}$ − f$_b$)/f$_b$ | 1.37 | 1.56 | 2.10 | 2.41 | 2.78 |

Ex. = Example
*FS = Flexural strength [kgf/mm$^2$]

TABLE 8

|  |  | Ex. 22 | Ex. 23 | Ex. 24 | Ex. 25 |
|---|---|---|---|---|---|
| Glass Composition (mol %) | SiO$_2$ | 63 | 63 | 64 | 65 |
|  | Al$_2$O$_3$ | 4 | 5 | 5 | 5 |
|  | CaO | 13 | 12 | 13 | 12 |
|  | BaO | 3 | 3 | 3 | 4 |
|  | CaO + BaO | 16 | 15 | 16 | 16 |
|  | Na$_2$O | 5 | 5 | 4 | 4 |
|  | K$_2$O | 5 | 5 | 6 | 6 |
|  | Na$_2$O + K$_2$O | 10 | 10 | 10 | 10 |
|  | TiO$_2$ | 3 | 3 | | |
|  | ZrO$_2$ | 4 | 4 | 4 | 4 |
|  | Total | 100 | 100 | 100 | 100 |
| Glass transition temperature [° C.] | | 653 | 660 | 661 | 661 |
| Sag temperature [° C.] | | 734 | 737 | 739 | 743 |
| Alkali-elution amount [µmol/cm$^2$] | | 0.025 | 0.014 | 0.010 | 0.010 |
| Average linear thermal expansion coefficient at 30-300° C. [×10$^{-7}$K$^{-1}$] | | 84 | 83 | 79 | 78 |
| Average linear thermal expansion coefficient at | | 87 | 86 | 83 | 82 |

TABLE 8-continued

|  | Ex. 22 | Ex. 23 | Ex. 24 | Ex. 25 |
|---|---|---|---|---|
| 100-300° C. [×10⁻⁷K⁻¹] | | | | |
| Specific gravity | 2.78 | 2.78 | 2.76 | 2.77 |
| Young's modulus [GPa] | 82.3 | 82.3 | 81.5 | 79.9 |
| Rigidity [GPa] | 33.2 | 82.2 | 33 | 32.3 |
| Poisson ratio | 0.238 | 0.237 | 0.24 | 0.24 |
| Specific elastic modulus [×10⁶ Nm/kg] | 29.6 | 29.6 | 29.6 | 28.8 |
| Liquidus temperature [° C.] | 1050 or less | 1050 or less | 1050 or less | 1050 or less |
| Ion-exchange temperature [° C.] | 420 | 420 | 420 | 420 |
| Ion-exchange time period [hour] | 3 | 3 | 3 | 3 |
| FS* Before chemical strengthening $f_b$ | 11.0 | 11.0 | 12.0 | 13.0 |
| After chemical strengthening $f_{20}$ | 32.0 | 33.2 | 29.5 | 30.1 |
| After heating at 570° C. for 2 hours $f_{570}$ | 16.5 | 19.3 | 20.1 | 21.0 |
| $(f_{570} - f_b)/f_b$ | 0.50 | 0.75 | 0.67 | 0.62 |
| $(f_{20} - f_b)/f_b$ | 1.9 | 2.02 | 1.46 | 1.32 |

Ex. = Example
*FS = Flexural strength [kgf/mm²]

表9

| | | Examples | |
|---|---|---|---|
| | | 26 | 27 |
| Glass Composition (mol %) | $SiO_2$ | 62.0 | 62.5 |
| | $Al_2O_3$ | 3.0 | 3.0 |
| | MgO | — | 0.5 |
| | CaO | 18.0 | 18.0 |
| | BaO | 3.0 | 3.0 |
| | MgO + CaO + BaO | 21.0 | 21.5 |
| | $Na_2O$ | 4.0 | 4.0 |
| | $K_2O$ | 5.0 | 5.0 |
| | $Na_2O + K_2O$ | 9.0 | 9.0 |
| | $TiO_2$ | 1.0 | — |
| | $ZrO_2$ | 4.0 | 4.0 |
| | Total | 100 | 100 |
| Glass transition temperature [° C.] | | 660 | 660 |
| Sag temperature [° C.] | | 743 | 750 |
| Alkali-elution amount [μmol/cm²] | | 0.013 | 0.013 |
| Average linear thermal expansion coefficient at 30–300° C. [×10⁻⁷ K⁻¹] | | 0 | 84.1 |
| Average linear thermal expansion coefficient at 100–300° C. [×10⁻⁷ K⁻¹] | | 87.0 | 87.4 |
| Specific gravity | | 2.81 | 2.80 |
| Young's modulus [GPa] | | 83.2 | 83.1 |
| Rigidity [GPa] | | 33.4 | 33.4 |
| Poisson ratio | | 0.245 | 0.244 |
| Specific elastic modulus [×10⁶ Nm/kg] | | 29.6 | 29.7 |
| Liquidus temperature [° C.] | | 1100 | 1150 |
| Ion-exchange temperature [° C.] | | 420 | 420 |
| Ion-exchange time period [hour] | | 3 | 3 |
| FS* Before chemical strengthening $f_b$ | | 12.0 | 12.0 |
| After chemical strengthening $f_{20}$ | | 30.0 | 31.0 |
| After heating at 570° C. for 2 hours $f_{570}$ | | 19.5 | 21.0 |

表9-continued

| | Examples | |
|---|---|---|
| | 26 | 27 |
| $(f_{570} - f_b)/f_b$ | 0.63 | 0.75 |
| $(f_{20} - f_b)/f_b$ | 1.50 | 1.58 |

Ex. = Example
*FS = Flexural strength [kgf/mm²]

TABLE 10

| | | Examples | | | | |
|---|---|---|---|---|---|---|
| | | 17 | 18 | 19 | 20 | 21 |
| Glass Composition (wt %) | $SiO_2$ | 54.80 | 54.80 | 54.80 | 54.80 | 54.75 |
| | $Al_2O_3$ | 5.90 | 5.90 | 5.90 | 5.90 | 5.90 |
| | ($SiO_2$ + $Al_2O_3$) | 60.70 | 60.70 | 60.70 | 60.70 | 60.70 |
| | MgO | — | — | — | — | — |
| | CaO | 10.50 | 10.50 | 10.50 | 10.50 | 10.55 |
| | SrO | — | — | — | — | — |
| | BaO | 6.70 | 6.70 | 6.70 | 6.70 | 6.65 |
| | ZnO | — | — | — | — | — |
| | (RO) | 17.20 | 17.20 | 17.20 | 17.20 | 17.20 |
| | $Na_2O$ | 3.60 | 3.60 | 3.60 | 3.60 | 3.59 |
| | $K_2O$ | 6.80 | 6.80 | 6.80 | 6.80 | 6.81 |
| | $Na_2O + K_2O$ | 10.40 | 10.40 | 10.40 | 10.40 | 10.40 |
| | $TiO_2$ | 4.60 | 4.60 | 4.60 | 4.60 | 4.62 |
| | $ZrO_2$ | 7.10 | 7.10 | 7.10 | 7.10 | 7.13 |
| | Total | 100 | 100 | 100 | 100 | 100 |

TABLE 11

| | | Examples | | | | | |
|---|---|---|---|---|---|---|---|
| | | 22 | 23 | 24 | 25 | 26 | 27 |
| Glass Composition (wt %) | $SiO_2$ | 54.89 | 54.54 | 55.75 | 55.74 | 54.70 | 55.50 |
| | $Al_2O_3$ | 5.92 | 7.35 | 7.39 | 7.28 | 4.50 | 4.50 |
| | ($SiO_2$ + $Al_2O_3$) | 60.82 | 61.88 | 63.14 | 63.02 | 59.20 | 60.00 |
| | MgO | — | — | — | — | — | 0.30 |
| | CaO | 10.57 | 9.70 | 10.57 | 9.60 | 14.90 | 14.90 |
| | BaO | 6.67 | 6.62 | 6.67 | 8.75 | 6.80 | 6.80 |
| | (RO) | 17.24 | 16.32 | 17.24 | 18.35 | 21.70 | 22.00 |
| | $Na_2O$ | 4.49 | 4.46 | 4.49 | 3.54 | 3.70 | 3.70 |

TABLE 11-continued

|  | Examples | | | | | |
|---|---|---|---|---|---|---|
|  | 22 | 23 | 24 | 25 | 26 | 27 |
| $K_2O$ | 6.83 | 6.78 | 6.83 | 8.06 | 6.90 | 7.00 |
| $Na_2O + K_2O$ | 11.32 | 11.24 | 11.32 | 11.60 | 10.60 | 10.70 |
| $TiO_2$ | 3.48 | 3.45 | 1.16 | — | 1.20 | — |
| $ZrO_2$ | 7.15 | 7.10 | 7.14 | 7.03 | 7.30 | 7.30 |
| Total | 100 | 100 | 100 | 100 | 100 | 100 |

As is clearly shown in Tables 4 and 5, the glasses in Examples 17 and 27 and the glasses containing $Sb_2O_3$ in addition to the glass compositions in Examples 17 to 27 had excellent properties or had a glass transition temperature (Tg) of 620° C. or higher, an average linear thermal expansion coefficient, measured at 30 to 300° C., of $60 \times 10^{-7}/K^{-1}$ or more, an average linear thermal expansion coefficient, measured at 100 to 300° C., of $70 \times 10^{-7}/K^{-1}$ or more, a specific gravity of 2.4 to 3.0, a Young's modulus of 75 GPa or more, a rigidity of 30 GPa or more, a specific elastic modulus of $26 \times 10$ Nm/kg, a Poisson ratio of 0.22 to 0.25, a flexural strength, measured after the chemical strengthening, of 15 $kgf/mm^2$ or more, a flexural strength, measured after heating at 570° C. for 2 hours, of 15 $kgf/mm^2$ or more, an (fT−fb)/fb value of 0.5 or more and an (f20−fb)/fb value of 1 or more.

The glass materials shown in Tables 4 and 5 were machined to disk-shaped substrates having an outer diameter of 65.0 mm, a central inner diameter of 20.0 mm and a thickness of 0.635 mm. These disk-shaped substrates had main surfaces polished and lapped so as to be flat and smooth, and their surfaces other than the main surfaces were polished so as to be flat and to be free from any fine scratches that were to decrease strength. Then, the substrates were cleaned to give clean substrates for an information recording medium. In a final step, the substrates may be immersed in pure water to decrease alkali ion concentrations in surfaces thereof as already explained.

The disk-shaped glass substrates formed of the glasses in Examples 17 to 27 and such substrates formed of the glasses further containing $Sb_2O_3$ are suitable as a nominal 2.5-inch substrate for an information recording medium, and particularly, those chemically strengthened glass substrates have high heat resistance and high strength and are therefore suitable as a substrate for a magnetic recording medium, particularly, as a substrate for a perpendicular-recording-mode magnetic recording medium.

The above disk-shaped substrates were produced by feeding a homogenized glass melt into a press mold, press-molding a disk-shaped glass into a disk-shaped product, gradually cooling the product, subjecting the resultant glass-shaped product to machining such as polishing and lapping and then chemical strengthening the product. In addition to the press-molding, the above glass product may be formed, for example, by a so-called float-shaping method in which a thin sheet glass is formed and the thin sheet glass is machined to the form of a disk. However, the float-shaping is not suitable for a glass containing $Sb_2O_3$. The above-obtained substrates for an information recording medium are washed with a wash liquid, and since the alkali-elution amount of each of the glasses constituting the substrates is at a remarkably low level, surface roughening of the substrates during the washing can be prevented. The main surface of each of the washed glass substrates had a center-line average roughness Ra of 0.1 to 0.6 nm.

Each glass substrate was measured for a center-line average roughness Ra with an atomic force microscope (AFM).

Example 28

Perpendicular-recording-mode magnetic disks were fabricated from the washed and dried glass substrates. In the formation of a magnetic recording layer, there were fabricated perpendicular-recording-mode magnetic disks of two types; magnetic disks having a two-layer film formed by consecutively stacking a soft magnetic layer and a magnetic recording layer, and magnetic disks having three-layer film formed by consecutively stacking a hard magnetic layer, a soft magnetic layer and a magnetic recording layer. In the above step, the magnetic recording layers were heat-treated at a high temperature of 400 to 600° C., and all the substrates retained high flatness without being deformed, since they had a glass transition temperature (Tg) of 620° C. or higher or high heat resistance.

The glass substrate of the present invention has a high glass transition temperature, so that it is suitable for high-temperature treatment for improving the properties of a magnetic recording medium and for forming a magnetic film with a high-temperature sputtering machine. Further, although the glass substrates containing an alkali metal were used, there was found no detrimental effect caused by the precipitation of an alkali from the substrates after the formation of the information recording layers.

While the above Examples have explained magnetic recording media as embodiments, the present invention can similarly give excellent results with regard to other substrate for other information recording medium and other information recording medium such as substrates for optical-recording-mode and magneto-optical-recording-mode information recording media and such information recording media.

EFFECT OF THE INVENTION

According to the substrate for an information recording medium, provided by the present invention, the glass transition temperature (Tg) thereof is 620° C. or higher and the alkali-elution amount thereof is very small, as small as 0.2 $\mu mol/cm^2$, so that the deformation of the substrate during high-temperature treatment in the formation of an information recording layer can be prevented, that the flatness of the substrate can be maintained, and that the degradation of smoothness caused on the substrate surface by the alkali elution and the influence of alkali elution on an information recording layer can be suppressed. The substrate for an information recording medium, provided by the present invention, can be therefore applied to a high-density-recording information recording medium such as a perpendicular-recording-mode magnetic recording medium.

Further, according to the substrate for an information recording medium, provided by the present invention, the average linear thermal expansion coefficient at 100 to 300° C. can be adjusted to $70\times10^{-7}/°$ C. or more, and when an information recording medium having the above substrate is incorporated into a drive unit, the thermal expansion property of the substrate can be adjusted to be consistent with the counterpart of a metal fixing member.

Further, according to the substrate for an information recording medium, provided by the present invention, the substrate can be imparted with a specific gravity of 3.5 or less while retaining high heat resistance and a low alkali-elution property in combination, so that there can be provided an information recording medium that makes it possible to decrease the driving torque.

The information recording medium of the present invention can accomplish higher-density recording both from the viewpoint of an information recording layer and from the viewpoint of the flatness and smoothness of the substrate, and it is made possible to prevent the corrosion of an information recording layer caused by the precipitation of an alkali metal from the substrate, so that the information recording medium of the present invention can be stably used for a longer period of time.

What is claimed is:

1. A substrate for an information recording medium, which substrate is made of an alkali-metal-oxide-containing glass formed from $SiO_2$, $Al_2O_3$, CaO, BaO, $K_2O$, MgO, SrO, $TiO_2$, $ZrO_2$, $Li_2O$, $Na_2O$ and ZnO which has no chemically strengthened layer and wherein the alkali-metal-oxide-containing glass substantially contains, by mol %, more than 50% but not more than 70% of $SiO_2$, 1 to 12% of $Al_2O_3$, 2 to 25% of CaO, more than 0% but not more than 15% of BaO, 3 to 15% of $K_2O$, 0 to 10% of MgO, 0 to 15% of SrO, 0 to 10% of $TiO_2$, 0 to 12% of $ZrO_2$, 0 to less than 1% of $Li_2O$, 0 to 8% of $Na_2O$ and 0 to 1% of ZnO, provided that BaO is present in an amount of more than 5% by weight, the glass having a glass transition temperature (Tg) of 620° C. or higher and satisfying a requirement that the alkali ion elution amount per a unit area when the glass is immersed in water having a temperature of 80° C. for 24 hours is 0.2 µmol/cm² or less.

2. A substrate for an information recording medium, which substrate is made of an alkali-metal-oxide-containing glass formed from $SiO_2$, $Al_2O_3$, CaO, BaO, $K_2O$, MgO, SrO, $TiO_2$, $ZrO_2$, $Li_2O$, $Na_2O$ and ZnO which has a chemically strengthened layer in a surface thereof and wherein the alkali-metal-oxide-containing glass substantially contains, by mol %, more than 50% but not more than 70% of $SiO_2$, 1 to 10% of $Al_2O_3$, 2 to 25% of CaO, 1 to 15% of BaO, 3 to 15% of $K_2O$, 0 to 3% of MgO, 0 to 15% of SrO, 0 to 10% of $TiO_2$, more than 0% but not more than 12% of $ZrO_2$, 0 to less than 1% of $Li_2O$, 1 to 8% of $Na_2O$ and 0 to 1% of ZnO, the total content of $SiO_2$, $Al_2O_3$ and $ZrO_2$ being more than 70% by weight, provided that BaO is present in an amount of more than 5% by weight, the glass having a glass transition temperature (Tg) of 620° C. or higher and satisfying a requirement that the alkali ion elution amount per a unit area when the glass is immersed in water having a temperature of 80° C. for 24 hours is 0.2 µmol/cm² or less.

3. The substrate for an information recording medium as recited in claim 1 or 2, which has an average linear thermal expansion coefficient (α), measured at a temperature of 100 to 300° C., of $70\times10^{-7}/°$ C. or more.

4. The substrate for an information recording medium as recited in claim 1 or 2, wherein the alkali-metal-oxide-containing glass has a specific gravity of 3.5 or less.

5. The substrate for an information recording medium as recited in claim 1 or 2, which is a substrate for a perpendicular-magnetic-recording-mode information recording medium.

6. An information recording medium comprising an information recording layer formed on the substrate for an information recording medium as recited in claim 1 or 2.

7. The information recording medium as recited in claim 1 or 2, which is a perpendicular magnetic recording medium.

8. The substrate for an information recording medium as recited in claim 2, which has a chemically strengthened layer in a surface thereof and wherein the alkali-metal-oxide-containing glass substantially contains, by mol %, more than 50% but not more than 70% of $SiO_2$, 1 to 10% of $Al_2O_3$, 15 to 25% of CaO, 1 to 15% of BaO, 3 to 15% of $K_2O$, 0 to 3% of MgO, 0 to 15% of SrO, 0 to 10% of $TiO_2$, more than 0% but not more than 12% of $ZrO_2$, 0 to less than 1% of $Li_2O$, 1 to 8% of $Na_2O$ and 0 to 1% of ZnO.

* * * * *